United States Patent [19]
Kondo

[11] 3,993,365
[45] Nov. 23, 1976

[54] ANTISKID CONTROL SYSTEM

[75] Inventor: Toshiyuki Kondo, Toyota, Japan

[73] Assignee: Aisin Seiki Kabushiki Kaisha, Kariya, Japan

[22] Filed: Oct. 21, 1975

[21] Appl. No.: 624,393

[30] Foreign Application Priority Data
Dec. 29, 1974 Japan................................ 50-2980

[52] U.S. Cl. .......................... 303/21 F; 188/181 A
[51] Int. Cl.² ......................................... B60T 8/06
[58] Field of Search .................... 188/181 A, 181 C; 303/10, 92, 113, 117

[56] References Cited
UNITED STATES PATENTS

| | | | |
|---|---|---|---|
| 3,514,161 | 5/1970 | Frayer ............................ | 303/21 FS |
| 3,671,085 | 6/1972 | Pasek et al. ..................... | 303/21 FM |
| 3,813,130 | 5/1974 | Inada ............................. | 303/21 FM |
| 3,861,757 | 1/1975 | Jackson et al. .................. | 303/21 FM |
| 3,926,480 | 12/1975 | Shibatani et al. ................ | 303/21 FS |

*Primary Examiner*—Duane A. Reger
*Attorney, Agent, or Firm*—Finnegan, Henderson, Farabow & Garrett

[57] ABSTRACT

An antiskid control system includes a hydraulic pressure control device connected between a braking hydraulic pressure source and wheel cylinders. The hydraulic pressure control device has a variable volume chamber adapted to cyclically vary the hydraulic brake pressure applied to the wheel cylinders from the braking hydraulic source and a valve adapted to control both the hydraulic pressure communication between the variable volume chamber and the wheel cylinders, and the hydraulic pressure communication between the braking hydraulic pressure source and the wheel cylinders. The variable volume chamber and the valve are also independently actuated in response to the sensed braking conditions of the wheel.

10 Claims, 2 Drawing Figures

ANTISKID CONTROL SYSTEM

BACKGROUND OF THE INVENTION

This invention relates to a antiskid control system and more particularly to a hydraulically actuated antiskid control system.

Conventionally, various antiskid control systems have been proposed wherein a variable volume chamber defined by a piston is provided to cyclically decrease and increase the brake fluid pressure applied to the wheel cylinders thereby releasing a locking condition of the wheels in response to signals generated from a computer; and a valve is also provided to selectively control the fluid comunication between the master cylinder of the braking hydraulic pressure source and the wheel cylinder, and the fluid communication between the variable volume chamber and the wheel cylinders.

In these systems, the variable volume of the chamber is effectively decreased and increased in response to the movement of the piston defining the variable volume chamber. The control valve is also actuated by the movement of the piston. This means that during the initial stage of antiskid control operation, the piston has to be moved to cause the control valve to interrupt fluid communication from the master cylinder to the wheel cylinders. In other words, the piston moves so as to increase the variable volume of the chamber before the fluid communication between the master cylinder and the wheel cylinders is interrupted by the control valve. Therefore, there is delay in the application of the antiskid control in releasing the locked brake. This not only delays the effect of the skid control but results in a large charge in the fluid pressure in the master cylinder. The feeling of control of the vehicle by the operator is thus adversely affected.

It should also be noted that in the prior art, the stroke of the piston has to be relatively lengthy and the piston has to be relatively large in diameter size to effect a satisfactory variation of the desired volume in the chamber. if it is desirable to reduce the diameter of the piston, then the stroke of the piston must be lengthened to satisfy the effective variation of the desired volume. This results in design difficulties and also in construction complexity.

Some of the above-mentioned antiskid control systems further comprise a by-pass passage which directly connects the master cylinder to the wheel cylinders when the antiskid device fails to operate. The bypass passage is normally closed by another valve which is arranged independently of the control valve for interrupting fluid communication from the master cylinder to the wheel cylinders during a locking condition of the wheels. This arrangement also requires complex construction and results in relatively high manufacturing costs.

SUMMARY OF THE INVENTION

Accordingly, it is a primary object of this invention to provide an antiskid control system which eliminates the above-described problems.

It is another object of this invention to provide an antiskid control system which is simple in construction and which is low in cost.

It is still another object of this invention to provide an antiskid control system which reduces or minimizes the change of fluid pressure in the master cylinder upon actuation of the antiskid control device.

It is a further object of this invention to provide an antiskid control system that makes it possible to decrease the diameter of the piston defining the variable volume chamber and also to minimize the stroke of that piston.

It is also an object of this invention to shorten the time between the locking of the brake and the application of the effect of the antiskid control system.

It is another object of this invention to provide an antiskid control system whereby the fluid communication between the variable volume chamber and the wheel cylinders, and the fluid communication between the master cylinder and the wheel cylinders are controlled by one valve.

It is still a further object of this invention to provide an antiskid control system which has a direct fluid connection from the master cylinder to the wheel cylinders when the antiskid control device fails to operate, and the control valve being adapted to also control this direct fluid connection.

Additional objects and advantages of the invention will be set forth in the description which follows, and, in part, will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the antiskid control system of the invention comprises: (1) a braking hydraulic pressure source; (2) a power source; (3) wheel cylinders; (4) first passage means for connecting the braking hydraulic pressure source to the wheel cylinders; (5) computer means for detecting a locking condition of the wheels and for producing an indicating signal upon the detection; (6) control means actuated in accordance with the indicating signal from the computer means; and (7) a hydraulic pressure control device provided in the first passage means and including (a) a housing, (b) means providing in the housing for varying the effective volume of the hydraulic pressure supplied to the wheel cyinders, (c) second passage means for connecting the means for varying the effective volume to the wheel cylinders, (d) valve means for selectively controlling the first and second passage means, (e) first servo means communicable with the power source by the control means for actuating the means for varying the effective volume, and (f) second servo means provided independently of the first servo means and communicable with the power source by the control means for actuating the valve means.

The invention consists in the novel parts, constructions, arrangements, combinations and improvements shown and described. The accompanying drawings, which are incorporated in and constitute a part of this specification, illustrate embodiments of the invention and, together with the description, serve to explain the principles of the invention.

Reference will now be made in detail to the present preferred embodiments of the invention, examples of which are illustrated in the accompanying drawings.

DETAILED DESCRIPTION OF THE INVENTION

Figure 1:
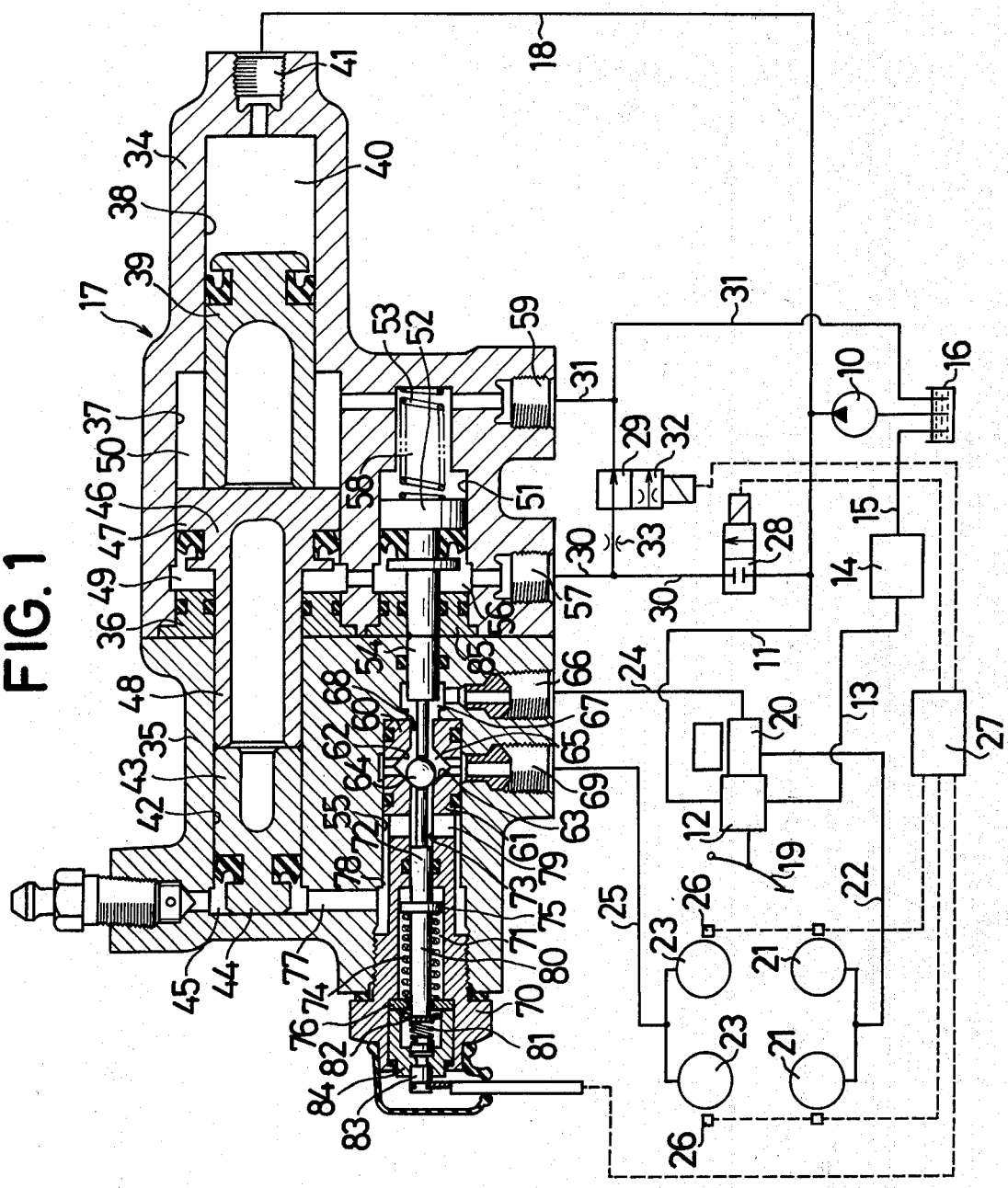
FIG. 1 is a diagrammatical view of one preferred embodiment of the antiskid control system constructed in accordance with the teachings of this invention with the antiskid actuator of the system being shown in a sectional view.

Referring now to the drawings, FIG. 1 shows a first preferred embodiment of the antiskid control system of this invention.

The antiskid control system of the invention includes a braking hydraulic pressure source, a power source, wheel cylinders, first passage means for connecting the braking hydraulic pressure source to the wheel cylinders, computer means for detecting a locking condition of the wheels and producing an indicating signal upon the detection, as known in the prior art, and, in accordance with the invention, control means actuated in response to the indicating signal from the computer means and a hydraulic pressure control device provided in the first passage means.

Preferably, the braking hydraulic pressure source and power source include a power steering pump 10 which continuously circulates the hydraulic pressure. The hydraulic pressure from the pump 10 normally circulates through a line 11, a brake booster 12, a line 13, a power steering gear 14 and a line 15 to a reservoir 16. The circulating hydraulic pressure is also transmitted from the pump 10 to the hydraulic pressure control device or antiskid control actuator 17 by a line 18 as will be described in detail hereinafter. The brake booster 12 is a conventional one which is actuated by a brake pedal 19 to energize a master cylinder 20 for effecting wheel braking. The master cylinder 20 is of the dual pressure chamber type with a first chamber directly communicating with wheel cylinders for front wheels 21 by a line 22 and a second chamber communicating with wheel cylinders for rear wheels 23 through a line 24, antiskid control actuator 17 and a line 25.

It is preferred that the computer means includes sensors 26 at rear wheels 23 which detect the rotation of the rear wheels to deliver a signal indicative of the rotating speed of the rear wheels in the conventional manner. A computer 27 receives the signal from the sensors 26 electrically connected thereto so that antiskid signals are delivered to the control means when the rear wheels 23 are likely to be locked or are locked. Preferably, the control means comprises solenoid valves 28 and 29. Computer 27 may be of a conventional type which can also deliver a first signal to cause a rapid increase of the braking pressure and a second signal to cause a slow increase of the braking pressure in response to the magnitude of the wheel deceleration. Computer 27 could also be operated to deliver both signals mentioned above in response to the difference in the magnitude between the vehicle speed and the rotating speed of the wheels. The computer such as embodied herein is well-known in the art, so a detailed explanation of its structure will be omitted.

Solenoid valve 28 is movable betwen a first position wherein a branch line 30 from line 11 is interrupted and a second position wherein branch line 30 is completed. Solenoid valve 29 is also movable between a first position wherein a branch line 31 from line 30 to reservoir 16 is fully completed and a second position wherein branch line 31 is completed only through an orifice means 32 provided in solenoid valve 29. Solenoid valves 28 and 29 are energized by the signals from the computer 27. Another orifice 33 is arranged in the branch line 31 between line 30 and solenoid valve 29.

In accordance with the invention, hydraulic pressure control device or antiskid control actuator 17 comprises a housing, means provided in the housing for varying the effective volume of the hydraulic pressure supplied to the wheel cylinder means, second passage means for connecting means for varying the effective volume to the wheel cylinder means, valve means for selectively controlling the first and second passage means, first servo means communicable with the power source by the control means for actuating the means for varying the effective volume, and second servo means provided independently of the first servo means and communicable with the power source by the control means for actuating the valve means.

Preferably, antiskid control actuator 17 includes housing sections 34 and 35 sealingly secured to each other through members 36 and 85 with seals. Housing section 34 has a stepped bore having large and small bores 37 and 38. Small bore 38 slidably receives a piston 39 so that a hydraulic pressure chamber 40 is defined at the right side of bore 38. An input port 41 in housing section 34 connects line 18 and chamber 40 to permit the conveyance of the hydraulic pressure from pump 10 the chamber 40. Therefore, piston 39 normally remains in a leftward position as shown in FIG. 1. Housing section 35 has a bore 42 which contains a slidable piston 43 therein. Piston 43 has a reduced end 44 to thereby define a chamber 45 at the left side of bore 42. A stepped piston 46 includes a large diameter portion 47 which is slidably disposed within bore 37 and a small diameter portion 48 which extends through member 36 and is slidable within bore 42. Pistons 46 and 43 are normally urged to a leftward position as shown in FIG. 1 by the fluid pressure within chamber 40 acting against piston 39.

As herein embodied, a control chamber 49 is formed by stepped piston 46 with bore 37. A drain chamber 50 is formed within bore 37 by pistons 39 and 46. Housing section 34 has a further stepped bore 51 which slidably receives a piston 52 which is, in turn, biased to the left by a spring 53. One end of spring 53 is seated against piston 52 and its opposite end is seated against the inner wall of housing section 34. The left end of piston 52 extends through member 85 to contact a piston 54 which is slidably received in a stepped bore 55 provided in housing section 35. A control chamber 56 is formed within bore 51 by piston 52 and member 85 and communicates with line 30 by a port 57 in housing section 34. Chamber 56 also communicates with control chamber 49. A chamber 53 containing spring 53 therein communicates with drain chamber 50 on the one hand and line 31 through a port 59 in housing section 34 on the other hand.

As can thus be seen from the above description of the preferred embodiment of the antiskid control actuator 17, the first servo means would preferably include the pistons 39 and 46, the control chamber 49, the drain chamber 50, and chamber 40, while the second servo means preferably includes the piston 52, the control chamber 56 and the chamber 58 with the spring 53. The means for varying the hydraulic pressure supplied to the wheel cylinders, in turn, would preferably include the piston 43 and the chamber 45.

Preferably, the valve means includes a pair of seat members 60 and 61 securely disposed within bore 55 and have valve seats 62 and 63, respectively. A ball valve 64 is positioned within a chamber 65 formed between seat members 60 and 61 and is normally urged to be contacted or engaged with valve seat 63 by the left end of piston 54. Piston 54 is urged leftwardly by spring 53 acting against piston 52. In other words, ball 64 is normally disengaged from seat 62 by piston 54.

During normal conditions when the wheels are not in a locking condition, line 24 communicates with line 25 through a port 66, a passage 67 in housing section 35, a hole 68 in seat member 60 and a port 69. An open end of bore 55 is securely closed by a plug having a stepped bore 71 therein. A piston 72 slidably disposed within bore 71 has its right end extending through a hole 73 in seat member 61 to engage with ball 64. Piston 72 is biased to the right by a spring 74 having one end seated against a shoulder 75 on piston 72 and its opposite end seated against a contact 76. Chamber 45 leads to hole 73 through a passage 77 in housing section 35, an annular passage 78 between plug 70 and the inner wall of housing section 35 and a passage 79 in plug 70. It is noted that the biasing force of spring 74 is less than that of spring 53, so spring 74 cannot disengage ball 64 from seat 63. Thus, during normal conditions without a locking condition, ball 64 is on seat 63, hole 73 is not in communication with chamber 65, and there is no hydraulic pressure within chamber 45.

A rod 80 is urged into contact with piston 72 by a spring 81 through a contact 82. Rod 80 may be formed of an insulating material and integrally with piston 72. No engagement between contacts 76 and 82 is made when rod 80 normally keeps contact 82 in a leftward position. During an antiskid operation, rod 80 is moved rightwardly, as will be discussed below, so that contact 82 is brought into contact with contact 76 to complete an electric circuit which includes computer 27, a conductor 83, spring 81, and contacts 82 and 76. Housing section 35 is grounded with an insulator 84 secured to it.

FIG. 1 illustrates the antiskid control system when no braking operation is occuring. A braking operation is initiated by the depression force on brake pedal 19 which energizes master cylinder 20 through actuation of brake booster 12. The hydraulic pressure within the first chamber of the master cylinder 20 is, therefore, directly conveyed through line 22 to wheel cylinders for front wheels 21 to effect braking. The hydraulic pressure within the second chamber of master cylinder 20 is conveyed to the wheel cylinders for rear wheels 23 to effect braking through line 24, port 66, passage 67, hole 68, chamber 65, port 69 and line 25.

During the braking operation mentioned above, pump 10 continues to circulate the hydraulic pressure to reservoir 16 through line 11, brake booster 12, line 13, power steering gear 14 and line 15 to thereby actuate power steering gear 14 when required. The hydraulic pressure from pump 10 is also transmitted to chamber 40 of antiskid control actuator 17 by line 18. The hydraulic pressure transmitted to chamber 40 only serves to urge and maintain pistons 39, 46 and 43 in their utmost leftward positions as shown in FIG. 1. A suitable spring may be substituted to provide the urging force to the pistons. This prevents any improper positioning of pistons 39, 46 and 43 due to the vibrations of parts of the like.

As will be hereinafter described, the proper antiskid operation will be achieved by the regular stroke of piston 43. When sensors 26 detect the rotation of the rear wheels 23 which indicates a locking condition, computer 27 which receives an antiskid signal from sensors 26 energizes solenoid valves 28 and 29. Therefore, solenoid valve 28 is now energized to establish hydraulic pressure communication to line 30 and solenoid valve 29 is energized to establish hydraulic pressure communication to line 31 through the orifice 32 in solenoid valve 29. Control chambers 56 and 49 now receive the hydraulic pressure from the actuation of brake booster 12 through line 11, solenoid valve 28, line 30 and port 57.

Since the hydraulic pressure communication between line 30 and reservoir 16 is now established by line 31, which has two orifices 33 and 32, the hydraulic pressure will be produced within control chambers 56 and 49. The stepped piston 52 is urged to the right by the hydraulic pressure within chamber 56 acting against the biasing force of spring 53 so that ball 64 is urged onto seat 62 of the seat 62 of the seat member 60 by piston 72 which is biased by spring 74. By doing so, ball 64 closes hole 68 connecting the master cylinder 20 to the wheel cylinders for rear wheels 23, and opens hole 73 connecting the wheel cylinders for rear wheels 23 and the chamber 45. The hydraulic pressure is now conveyed to chamber 45 from the wheel cylinders for rear wheels 23 through line 25, port 69, chamber 64, hole 73 and passages 79, 78 and 77. Thereafter, power piston 46 and piston 39 are moved to the right by the hydraulic pressure in control chamber 49 acting against the hydraulic pressure in chamber 40. The piston 43 follows the movement of piston 46 because of the hydraulic pressure within chamber 45 to thereby increase the effective volume of chamber 45. This means that the braking pressure for the rear wheel cylinders will be decreased to prevent the locking of rear wheels 23.

When the locking of rear wheels 23 is prevented or released, the computer 27 delivers either of the two signals previously mentioned to cause the braking pressure for rear wheels 23 to increase depending on the degree of recovery of the locking condition of rear wheels 23 as far as the brake pedal 19 is stepped on.

If computer 27 delivers the first signal which causes the braking pressure to rapidly increase, both of solenoid valves 28 and 29 are deenergized and are returned back to their original positions as shown in FIG. 1. Hydraulic pressure within chambers 49 and 56 is rapidly drained out to reservoir 16 by lines 57, 30 and 31 having only one orifice 33 therein. The hydraulic pressure communication between line 11 and port 57 is closed by solenoid valve 28. Thus, pistons 46 and 39 are rapidly moved to the left and piston 43 also follows in the same direction to reduce the effective volume of chamber 45. This results in the rapid increase of the braking pressure for the rear wheel cylinders. After piston 43 is returned back to its original position, piston 52 is moved to the left and the ball 64 is moved in its illustrated position to communicate the master cylinder 20 with the rear wheel cylinders.

If computer 27 delivers the second signal which causes the braking pressure to slowly increase after the lock of rear wheels 23 is released, only solenoid valve 28 is deenergized to interrupt the hydraulic pressure communication between line 11 and port 57 through line 30. Solenoid valve 29 still remains in its energized position. Therefore, the hydraulic pressure within the chambers 49 and 56 is slowly drained out to reservoir 16 through two orifices 33 and 32. Pistons 39, 46 and 43 are slowly returned back to their original positions to slowly reduce the effective volume of chamber 45. This results in a slow increase of the braking pressure for the rear wheel cylinders.

The antiskid operation mentioned above will be cyclically repeated to effect a complete release of the locking condition of rear wheels 23. During the antiskid operation wherein ball 64 engages with seat 62 of seat member 60, the piston 72 and rod 80 are moved to the right by the spring 74 so that the contacts 82 and 76 engage each other. The electric circuit is now completed to indicate an alarm to the drive that the antiskid control actuator is in operation.

When brake booster 12 receives no hydraulic pressure due to a failure of pump 10 or the like, the hydraulic pressure is normally produced within master cylinder 20 by the depression force of brake pedal 18 in the conventional manner. Accordingly, a braking operation is still assured through the same lines as that during normal braking conditions. Under this failure condition, the loss of any hydraulic pressure will be prevented since ball 64 continues to interrupt the hydraulic pressure communication between chamber 65 and hole 73.

Figure 2:
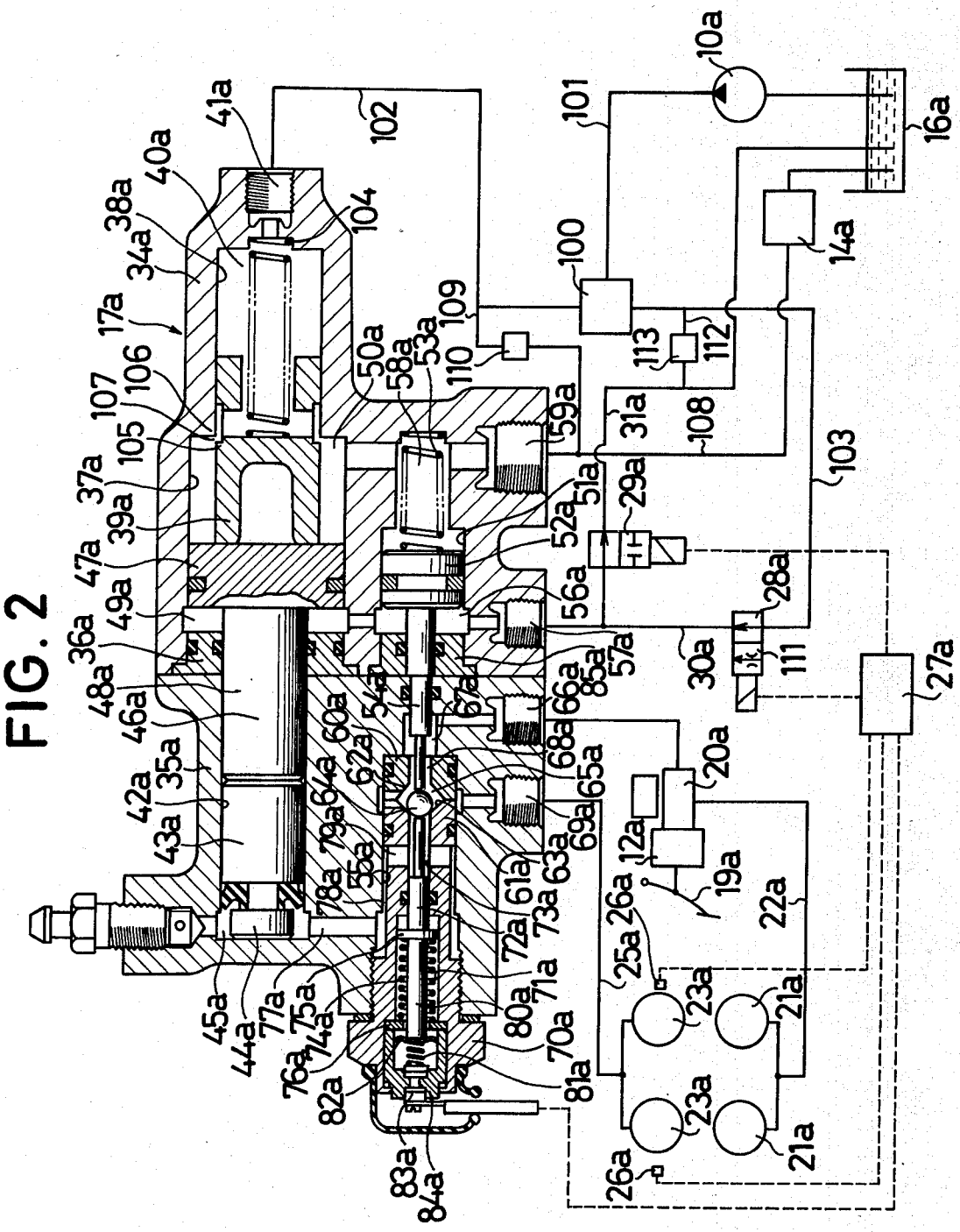
FIG. 2 is a similar view to FIG. 1, but showing another preferred embodiment of the antiskid control system constructed in accordance with the teachings of this invention.

Reference is now made to FIG. 2 which illustrates a second preferred embodiment of the antiskid control system of this invention. The same elements which attain the same functions as those described and shown in the first embodiment of FIG. 1 have the same numerals with an affix a. Reference is made to the previous description and operation of these elements so that no further explanation is deemed necessary.

A flow divider 100 receives the circulating hydraulic pressure from the pump 10a by a line 101 and transmits one portion of the hydraulic pressure by a line 102 to the inlet port 41a of the antiskid control actuator 17a and the other portion by a line 103 to the solenoid valve 28a. The hydraulic pressure at the inlet port 41a is always transmitted to the chamber 40a which contains a spring 104 therein. Spring 104 has one end seated against the inner wall of the housing 34a and its opposite end seated against the piston 39a to thereby bias the piston 39a in a leftward position as shown in FIG. 2. An annular recess 105 provided on the piston 39a and a stepped portion 106 formed in the housing 34a serve as a throttle valve 107 which normally permits the hydraulic pressure flow therebetween. Throttle valve 107 may be constructed so as to maintain a low hydraulic pressure within the chamber 40a during the normal condition. In this case, the provision of the spring 104 is not always necessary because the low hydraulic pressure in the chamber 40a urges and maintains the piston 39a in its leftward position.

The hydraulic pressure in the chamber 40a is normally returned to reservoir 16a through throttle valve 107, the chambers 50a and 58a, the port 59a, and a line 108. The power steering gear 14a is disposed within line 108. A line 109 provided between lines 102 and 108 contains a safety valve 110 therein which permits the hydraulic pressure flow from line 102 to line 108 when the hydraulic pressure within line 102, namely, the chamber 40a, exceeds a predetermined value. The line 103 is in communication with the line 30a through solenoid valve 28a. Solenoid valve 28a has a first position which allows direct hydraulic pressure communication between the lines 103 and 30a, and a second position which allows hydraulic pressure communication between the lines 103 and 30a through an orifice 111 provided in solenoid valve 28a. Solenoid valve 29a is movable between a first position which opens the line 31a and a second position which closes the line 31a. According, the solenoid valves 28a and 29a are not performing the exact same functions as those solenoid valves shown in FIG. 1. However, solenoid valves 28a and 29a are energized by the signals from the computer 27a. A line 112 connects the line 103 and the line 31a and contains a relief valve 113 therein which circulates the hydraulic pressure from line 103 to line 31a when the hydraulic pressure is abnormally increased due to the failure of solenoid valves 28a and 29a or the like. In this embodiment, the brake booster 12a may be a vacum-operated type.

The operations of this embodiment of the antiskid control system during a normal braking application without a wheel locking condition, and during a hydraulic pressure failure condition from the pump 10a or the like, are achieved in the same way as described in detail for that of the first embodiment of FIG. 1. Reference is made to this previous detailed description so that no additional explanation is necessary.

When the sensors 26a detect a locking condition of rear wheels 23a and deliver an antiskid control signal to the computer 27a, solenoid valve 29a is energized by the signal from the computer 27a to interrupt the passage 31a. Thus, the chambers 56a and 49a receive the hydraulic pressure from the pump 10a so that the ball 64a interrupts hydraulic pressure communication from the master cylinder 20a to the wheel cylinders for rear wheels 23a and establishes hydraulic pressure communication from the wheel cylinders for wheels 23a to the chamber 45a in the same manner as that of the first embodiment. The pistons 43a and 46a and 39a are moved to the right by the hydraulic pressure within the chambers 45a and 49a to thereby increase the volume of the chamber 45a. The braking pressure for the rear wheel cylinders will be decreased to prevent the locking condition of rear wheels 23a. In doing so, the rightward movement of piston 39a may close the throttle valve 107, and the hydraulic pressure within the chamber 40a remains at the value set by safety valve 110. This remaining hydraulic pressure in chamber 40a serves to maintain piston 39a at the proper position thereof.

When the computer 27a delivers an antiskid control signal to energize the solenoid valve 28a, line 103 communicates with line 30a through the orifice 111 in solenoid valve 28a so as to slowly transmit hydraulic pressure from the pump 10a to the chambers 56a and 49a. Consequently, the rightward movement of the piston 46a is slowed, and the reduction of hydraulic pressure at the rear wheel cylinders is also showed. The computer 27a delivers the signal to energize solenoid valve 28a depending on the degree of the locking condition of the rear wheels.

When the valve 29a is deenergized by a signal from the computer 27a during a release of the locking condition of rear wheels while the valve 28a is still energized to maintain hydraulic pressure communication between lines 103 and 30a through the orifice 111, the hydraulic pressure within the chamber 49a and 56a is rapidly drained out. Since the hydraulic pressure in the chamber 40a is now high enough due to the piston 39a closing the throttle valve 107, the return leftward movements of the pistons 39a, 46a and 43a are rapidly achieved. This results in the rapid increase of the braking pressure for the rear wheel cylinders. When the solenoid valve 28a is also deenergized so as to return to its original position, the return leftward movements of the pistons 39a, 46a and 43a will be slowly achieved. This results in the low increase of the braking pressure for the rear wheel cylinders. The antiskid operation mentioned above will be cyclically repeated to effect a complete release of the locking condition of the rear wheels 23a.

As can be seen from the foregoing, the piston 52 or 52a is provided only to actuate the ball 64 or 64a respectively so that the stroke or the diameter of the piston 52 or 52a can be minimized. In other words, the consumption of the master cylinder hydraulic pressure will be minimized until the ball 64 or 64a closes the hydraulic pressure communication between the master cylinder 20 or 20a and the rear wheel cylinders. Thus, the variations in the master cylinder hydraulic pressure will be reduced during the locking condition of rear wheels.

It will be apparent to those skilled in the art that various modifications and variations could be made in the preferred embodiments of the invention without departing from the scope or spirit of the invention.

What is claimed is:

1. An antiskid control system comprising:
   a. a braking hydraulic pressure source;
   b. a power source;
   c. wheel cylinders;
   d. first passage means for connecting said braking hydraulic pressure source to said wheel cylinders;
   e. computer means for detecting a locking condition of the wheels and for producing an indicating signal upon said detection;
   f. control means actuated in response to said indicating signal from said computer means; and
   g. a hydraulic pressure control device provided in said first passage means and including:
      i. a housing,
      ii. means provided in said housing for varying the hydraulic pressure supplied to said wheel cylinders,
      iii. second passage means for connecting said means for varying the hydraulic pressure supplied to the wheel cylinders to said first passage means,
      iv. a single valve for selectively controlling both said first and second passage means,
      v. first servo means communicable with said power source by said control means for actuating said means for varying the hydraulic pressure supplied to the wheel cylinders,
      vi. second servo means communicable with said power source by said control means for actuating said single valve, and wherein said valve includes two opposed valve seats formed at ends of said first and second passage means and a valve member normally positioned for closing said second passage means by said second servo means and positioned by said second servo means for closing said first passage means during a locking condition of the wheels.

2. An antiskid control system as set forth in claim 1, wherein said first servo means comprises a first control chamber which selectively receives the hydraulic pressure from said power source under the control of said control means and a first slidable piston means urged by the hydraulic pressure within said first control chamber in a direction in which said means for varying the hydraulic pressure supplied to the wheel cylinder reduces the hydraulic pressure supplied to the wheel cylinders, and said second servo means comprises a second control chamber which selectively receives the fluid pressure from said power source under the control of said control means and a second slidable piston means urged by the hydraulic pressure within said second control chamber in a direction in which said first passage means is closed by said valve member.

3. An antiskid control system as set forth in claim 2, wherein said first servo means further comprises first means for urging said first piston means against the hydraulic pressure within said first control chamber, and wherein said second servo means further comprises second means for urging said second piston means against the hydraulic pressure within said second control chamber.

4. An antiskid control system as set forth in claim 3, wherein said first urging means comprises a chamber for receiving, from said power source, hydraulic pressure which is applied to one side of said first piston means.

5. An antiskid control system as set forth in claim 4, further comprising throttle valve means for controlling a drain of the hydraulic pressure within said chamber of said first urging means.

6. An antiskid control system as set forth in claim 3, wherein said first urging means comprises a spring.

7. An antiskid control system as set forth in claim 3, wherein said second urging means comprises a spring.

8. An antiskid control system as set forth in claim 1, wherein said second servo means further includes means for biasing said valve member toward closure of said first passage means.

9. An antiskid control system as set forth in claim 8, further comprising means for alarming during the releasing operation of a locking condition of the wheels in response to the relative position of said biasing means.

10. An antiskid control system as set forth in claim 1, wherein said control means comprises means for varying the transmitting speed of the hydraulic pressure to and from said first and second servo means.

* * * * *